United States Patent
Kanbara et al.

(10) Patent No.: US 7,430,545 B2
(45) Date of Patent: Sep. 30, 2008

(54) POWER SUPPLY/DEMAND CONTROL SYSTEM

(75) Inventors: Teruhisa Kanbara, Toyonaka (JP);
Hisaaki Gyoten, Shijonawate (JP);
Hidekazu Tanigawa, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 871 days.

(21) Appl. No.: 10/148,383

(22) PCT Filed: Sep. 27, 2001

(86) PCT No.: PCT/JP01/08472

§ 371 (c)(1),
(2), (4) Date: May 31, 2002

(87) PCT Pub. No.: WO02/29952

PCT Pub. Date: Apr. 11, 2002

(65) Prior Publication Data

US 2003/0078797 A1    Apr. 24, 2003

(30) Foreign Application Priority Data

Sep. 29, 2000 (JP) ............................. 2000-300058
Oct. 2, 2000 (JP) ............................. 2000-302187

(51) Int. Cl.
G01R 11/56 (2006.01)
G01R 21/133 (2006.01)
G06F 17/00 (2006.01)
G01F 1/00 (2006.01)
G05D 17/00 (2006.01)

(52) U.S. Cl. .................. 705/412; 713/300; 700/291
(58) Field of Classification Search ............. 705/412
See application file for complete search history.

(56) References Cited

U.S. PATENT DOCUMENTS 4,190,800 A * 2/1980 Kelly et al. ............ 340/310.12
4,264,960 A * 4/1981 Gurr ........................ 700/295
4,471,232 A * 9/1984 Peddie et al. ................ 307/35

(Continued)

FOREIGN PATENT DOCUMENTS

DE    196 12 776 A1    10/1997

(Continued)

OTHER PUBLICATIONS

Berry, David et al., "Contracting for Power", Oct. 1995, Business Economics, V. 30, N. 4, p. 51.*

(Continued)

*Primary Examiner*—John W Hayes
*Assistant Examiner*—Fadey S Jabr
(74) *Attorney, Agent, or Firm*—McDermott Will & Emery LLP

(57) ABSTRACT

In order to effectively supply and demand electric power between an electric power supplier and a node or a group of nodes individually having an electric power generator, the present invention provides an electric power supply and demand management system capable of obtaining the difference between the total of electric power supplied from the electric power supplier to the node or group and the total of electric power consumed by the electric power loads of the node or group and capable of transmitting information for increasing/decreasing the amount of electric power supply so that the difference becomes smaller to the electric power supplier.

14 Claims, 10 Drawing Sheets

U.S. PATENT DOCUMENTS

| | | | |
|---|---|---|---|
| 4,589,075 A * | 5/1986 | Buennagel | 700/286 |
| 4,608,560 A * | 8/1986 | Allgood | 340/825.52 |
| 4,749,992 A * | 6/1988 | Fitzemeyer et al. | 340/870.02 |
| 4,940,976 A * | 7/1990 | Gastouniotis et al. | 340/870.02 |
| 5,079,715 A * | 1/1992 | Venkataraman et al. | 702/62 |
| 5,237,507 A | 8/1993 | Chesek et al. | |
| 5,794,212 A | 8/1998 | Mistr, Jr. | |
| 5,974,369 A | 10/1999 | Radtke et al. | |
| 5,974,403 A | 10/1999 | Takriti et al. | |
| 6,047,274 A | 4/2000 | Johnson et al. | |
| 6,327,541 B1 * | 12/2001 | Pitchford et al. | 702/62 |
| 6,697,951 B1 * | 2/2004 | Sinha et al. | 713/300 |
| 2001/0025209 A1 * | 9/2001 | Fukui et al. | 700/291 |
| 2002/0046155 A1 * | 4/2002 | Mashinsky et al. | 705/37 |
| 2003/0158826 A1 * | 8/2003 | Burke et al. | 705/412 |
| 2008/0010182 A2 * | 1/2008 | Johnson et al. | 705/37 |

FOREIGN PATENT DOCUMENTS

| | | |
|---|---|---|
| EP | 0560263 A2 | 9/1993 |
| JP | 05-260567 | 10/1993 |
| JP | 11-308771 | 11/1999 |
| JP | 2002-58159 | 2/2002 |
| WO | WO 99/09632 | 2/1999 |
| WO | WO 99/62161 | 12/1999 |

OTHER PUBLICATIONS

Sonderegger "Distributed Generation Architecture and Control", E-Vision Conference Proceedings, 2000, pp. 292-301, XP-02278957.

* cited by examiner

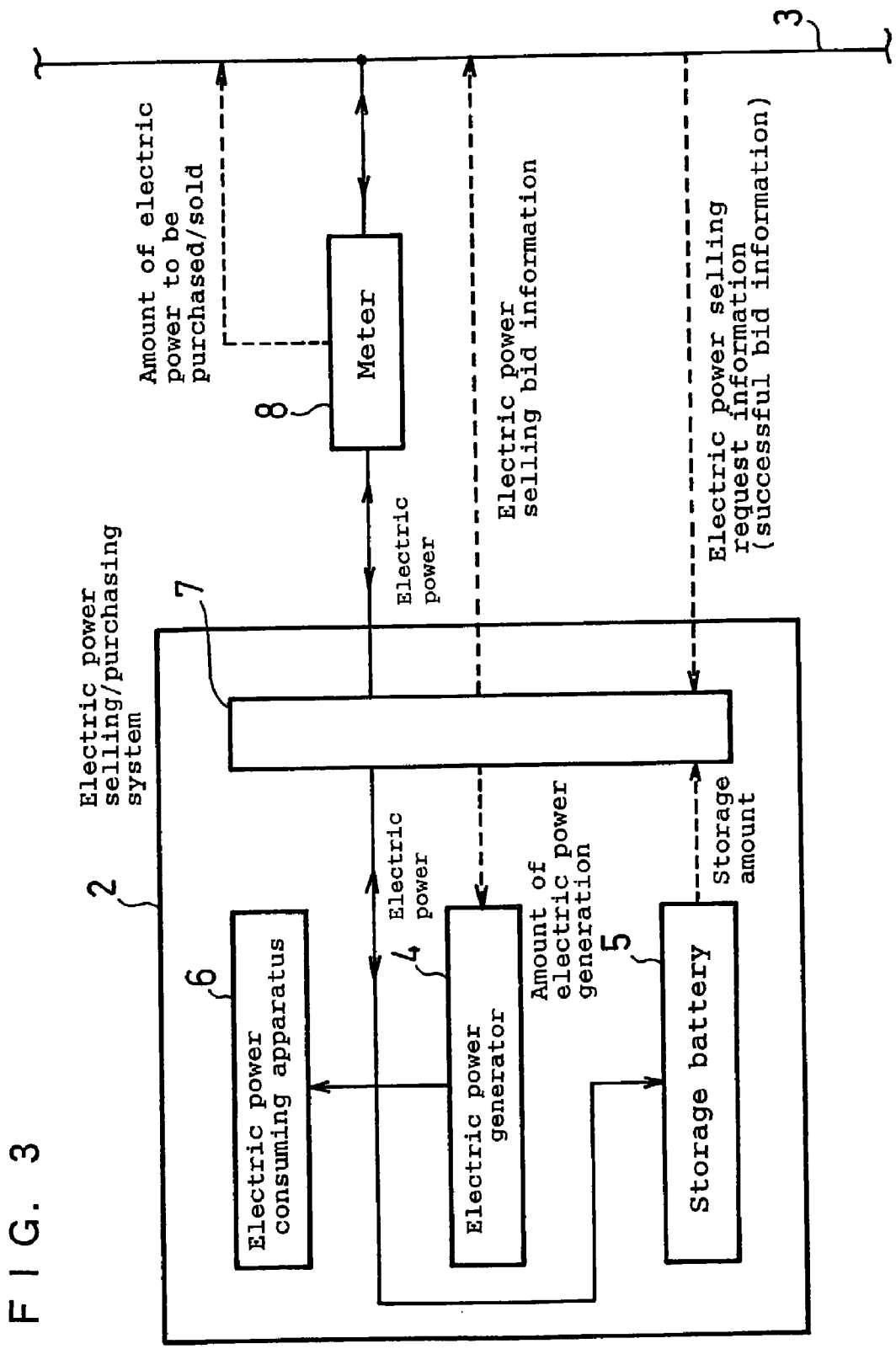
F I G. 3

F I G. 4

| Bid information table | | | |
|---|---|---|---|
| Identification No. of node | Selling price of electric power | Salable electric power | Successful bid information |
| 1 | 1 0 0 | 6 | 0 |
| 2 | — | 0 | 0 |
| 3 | 6 4 | 1 0 0 | 0 |
| 4 | — | 0 | 0 |
| 5 | 4 6 | 8 8 | 0 |
| 6 | 7 8 | 7 | 0 |

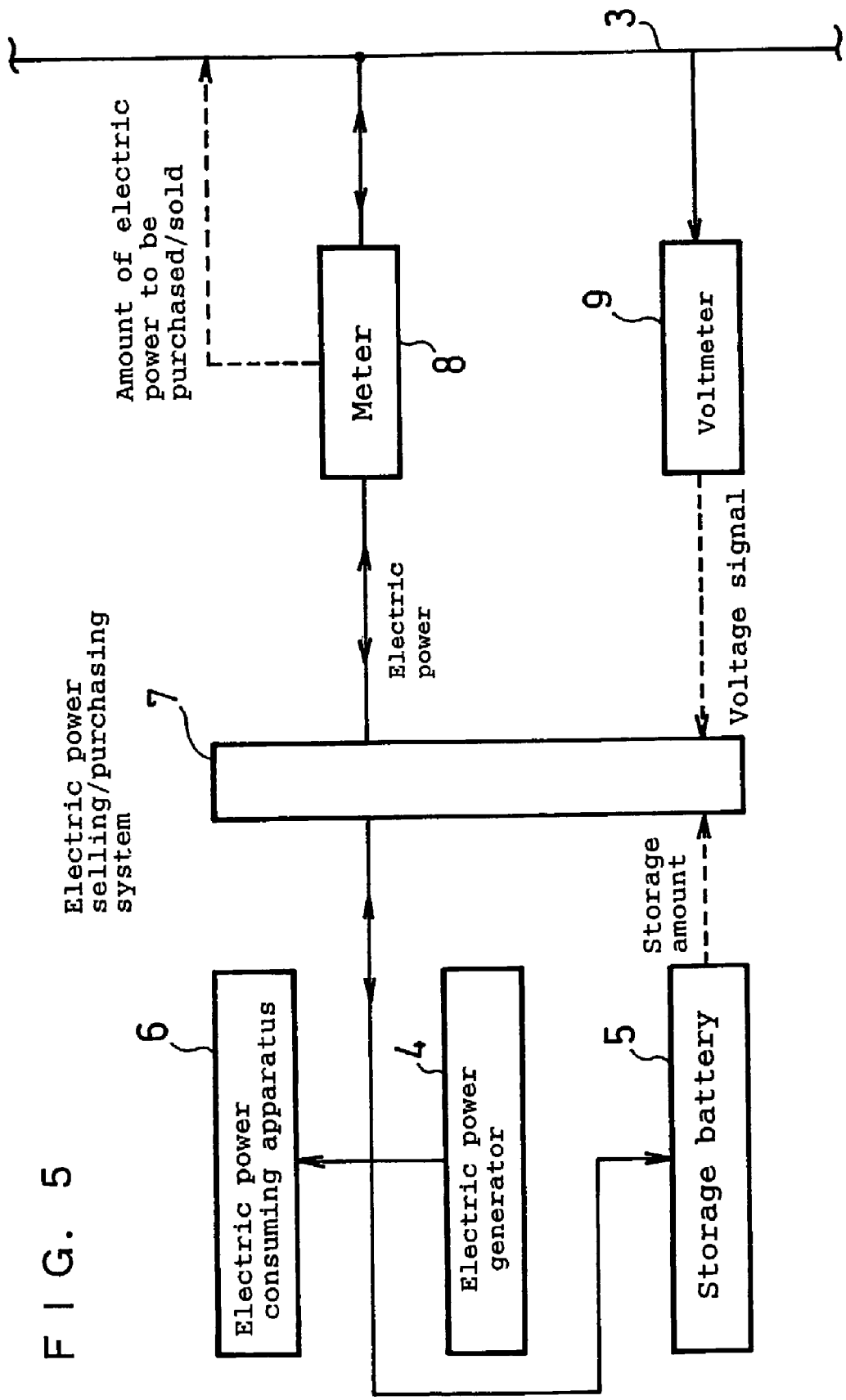
F I G. 5

FIG. 10

Data indicating relation between output of electric power generator and amount of fuel consumption

| Output | Amount of fuel consumption |
|---|---|
| 0 | 0 |
| 1 | 0.1 |
| 2 | 0.2 |
| 3 | 0.5 |
| 4 | 0.7 |
| 5 | 0.9 |
| 6 | 1.2 |
| 7 | 1.5 |
| 8 | 1.8 |
| 9 | 2.3 |
| 10 | 2.7 |
| 11 | 3.1 |
| 12 | 3.6 |

POWER SUPPLY/DEMAND CONTROL SYSTEM

TECHNICAL FIELD

The present invention relates to a distributed electric power generation system comprising an electric supplier and consumers for efficiently controlling and managing the supply and demand of electric power.

BACKGROUND ART

In recent years, energy-saving measures have been taken significantly in view of environmental protection including the prevention of the greenhouse effect owing to carbon dioxide, although not so significantly as those during the oil crisis owing to oil shortage. Consumers of electric power are classified into industrial consumers and household consumers; the electric power consumption by the industrial consumers stays almost constant after 1970s, but the electric power consumption by the household consumers has increased twice or more after 1970s. Hence, additional energy-saving measures are required to be taken for household consumers.

At present, the great majority of electric power generated by electric power supplier sides, such as hydraulic, thermal and atomic electric power generation, is transmitted by a system comprising electric power transmission lines, substations, etc. and supplied to consumer sides, such as households and factories. In this kind of large electric power generation system, heat generating simultaneously with electric power generation cannot be used, and the loss of electric power transmission from electric power stations to consumers is large, whereby the final energy efficiency is low. Particularly in household consumers having many distributed loads with low amount of electric power consumption, energy efficiency becomes low.

For this reason, attention is paid recently to the so-called distributed electric power generation, that is, electric power generation by small-scale electric power generators near electric power consumption regions, and in particular, attention is paid to cogeneration-type electric power generation wherein electric power is generated by a gas turbine or a fuel cell and waste heat generated during electric power generation can also be used.

In this kind of distributed electric power generation, each of nodes, such as a household, a factory, a company, a building and a school, itself has an electric power generator, and the node purchases lacking electric power from an outside commercial electric power system (an electric power company, an electric power supplier or the like) and sells extran electric power to an electric power supplier, thereby performing the so-called "trading of electric power."

Even in this kind of distributed electric power generation, if the sale of electric power to a commercial electric power system is carried out regardless of the present electric power demand, a transmission loss occurs in the case when a node that sells electric power is distant from an electric power supplier who purchases the electric power; however, conventionally, electric power should only be generated at one location and transmitted efficiently to locations near consumers; hence, if contractors who sell electric power are few, the transmission system is not affected greatly.

However, if each node sells extran electric power, transmission cost changes greatly depending on the distributions of electric power selling locations and electric power consuming locations. Accordingly, the present invention is intended to provide an electric power supply and demand management system capable of reducing the transmission loss and controlling and managing the supply and demand of electric power efficiently by selecting a node that can sell electric power from the electric power generator thereof the anode to an electric power supplier depending on the demand at the other nodes.

Furthermore, when a fuel cell is used as an electric power generator at the node, a time lag of at least one to two hours occurs until a fuel gas, such as hydrogen or propane gas, and oxygen are supplied to the fuel cell and then electric power generation starts. For this reason, when electric power is generated at a node, such as a dwelling house, wherein electric power demand greatly changes depending on time, season, or the like, the amount of electric power generated by the fuel cell cannot be controlled promptly depending on the change in the electric power demand at the node, whereby generated electric power becomes excessive or lacking. This causes a problem, that is, the above-mentioned node must purchase lacking electric power from the outside in spite of having an electric power generator or sell excessive electric power to the outside.

Accordingly, the present invention is intended to provide an electric power supply and demand management system capable of allowing a fuel cell used as an electric power generator to generate an appropriate amount of electric power, not excessive nor lacking, depending on the supply and demand at each node.

DISCLOSURE OF INVENTION

The present invention relates to an electric power supply and demand management system including an electric power supplier, an electric power transmission system, and electric power consuming nodes, each of which having an electric power generator, connected to the electric power transmission system and classified into a plurality of groups, characterized by comprising, a first calculation unit for obtaining a difference between a total of electric power supplied from the electric power supplier to the node or group and a total of electric power consumed by an electric power load of the node or group, and a first transmission unit for transmitting information for increasing/decreasing an amount of electric power supply to the electric power supplier so that the difference becomes smaller.

It is effective that the first calculation unit determines at least one of a selling price of electric power from the electric power supplier to the node or group and a purchase price of electric power from the node or the group to the electric power supplier, by using the difference between a total of electric power supply from the electric power supplier to the node or group and a total of electric power consumed by an electric power load at the node or group as a parameter, and the first transmission unit transmits at least one of the selling price and the purchase price to the node or group.

It is effective that the electric power supplier has a reception unit for receiving information selected from the group consisting of an electric power charge, an amount of electric power consumption and an electric power supply capacity of the node or the group, the first calculation unit determines an amount of electric power and a purchase price of electric power demanded by the electric power supplier for each node, which can sell electric power among the nodes, on the basis of the information, and the first transmission unit transmits at least one of the amount of electric power and the purchase price demanded by the electric power supplier to the node.

It is effective that the node or the group is provided with; a second transmission unit for transmitting information selected from the group consisting of an electric power charge, an amount of electric power consumption and an electric power supply capacity to other nodes, groups or the electric power supplier; a second reception unit for receiving information selected from the group consisting of an amount of electric power, a purchase price of electric power and a selling price of electric power demanded by the other nodes, groups or the electric power supplier; and a control unit for controlling an output of the electric power generator of the node on the basis of the information.

It is effective that the electric power supply and demand management system comprises a node information storage unit for storing node information including a node identifier for identifying the node and an amount of electric power consumption and an amount of electric power supply of the node identified by the identifier, and that the first calculation unit calculates an amount of transmittable electric power from one node to other nodes and/or the electric power supplier by using the amount of electric power consumption and the amount of electric power supply included in the node information as parameters, the first transmission unit transmits a signal indicating the amount of transmittable electric power to each node, and the node transmits the transmittable electric power to the other nodes and/or the electric power supplier.

It is effective that the electric power supplier has a substation, the first calculation unit calculates a purchase amount of electric power and a purchase price of electric power, which are demanded by the electric power supplier, by using electric power supply and demand information regarding a flowing direction and an amount of energy between a high-voltage side to a low-voltage side of the substation, and the first transmission unit transmits the amount of electric power to be purchased and the purchase price to the node or the group.

It is effective that the node is provided with a storage battery, and a second calculation unit for determining at least one selected from the group consisting of a purchase amount of electric power, a purchase price of electric power, a selling amount of electric power and a selling price of electric power, which are demanded for the other nodes, by using information regarding electric power demand and storage amounts of storage batteries connected to other nodes, and the second transmission unit transmits at least one selected from the group consisting of a purchase amount of electric power, a purchase price of electric power, a selling amount of electric power and a selling price of electric power to at least one of the electric power supplier and the other nodes.

It is effective that the first calculation unit or the second calculation unit predicts an amount of electric power consumption at the node or the group and determines an amount of electric power supply, which is demanded by the node or the group, by using the predicted the amount of electric power consumption as a parameter, and the first transmission unit or the second transmission unit transmits a signal in order for an electric power generator of a node or a group other than the node or the group, or for the electric power supplier to supply the amount of electric power.

It is effective that the electric power supply and demand management system comprises further electric power consumption amount storage means for storing information regarding an amount of electric power consumption at each node, and that the first calculation unit or the second calculation unit predicts an amount of electric power consumption at each node or each group by using the stored amount of electric power consumption as a parameter.

It is effective that the first calculation unit or the second calculation unit determines an amount of electric power supply from the node by using data including a relation between an output of the electric power generator and an amount of fuel consumption as parameters.

It is effective that the first calculation unit or the second calculation unit determines an amount of electric power supply from the electric power generator by using at least the amount of electric power consumption at the node as a parameter.

It is effective that the first calculation unit or the second calculation unit determines an amount of electric power supply of each electric power generator so that the number of electric power generators in operation of the nodes becomes minimum or maximum.

It is effective that the first calculation unit or the second calculation unit predicts an amount of electric power consumption at each node by using schedule information.

It is effective that the first transmission unit or the second transmission unit transmits information for increasing/decreasing an amount of electric power supply from the storage battery of the each node or the electric power generator connected to the storage battery to a node, which requires electric power, by using information regarding a storage amount of the storage battery or information regarding a transfer amount of energy of each node.

BRIEF DESCRIPTION OF DRAWINGS

FIG. 3 is a view showing the configuration of an electric power supply and demand management system in accordance with Embodiment 3 of the present invention.

FIG. 4 is an example of a table of bid information including the identification numbers of nodes, selling price of electric power and selling amount of electric power.

FIG. 5 is a view showing the configuration of an electric power supply and demand management system in accordance with Embodiment 4 of the present invention.

FIG. 10 is an example of data representing the relation between the output of an electric power generator and the usage amount of fuel.

BEST MODE FOR CARRYING OUT THE INVENTION

Figure 1:
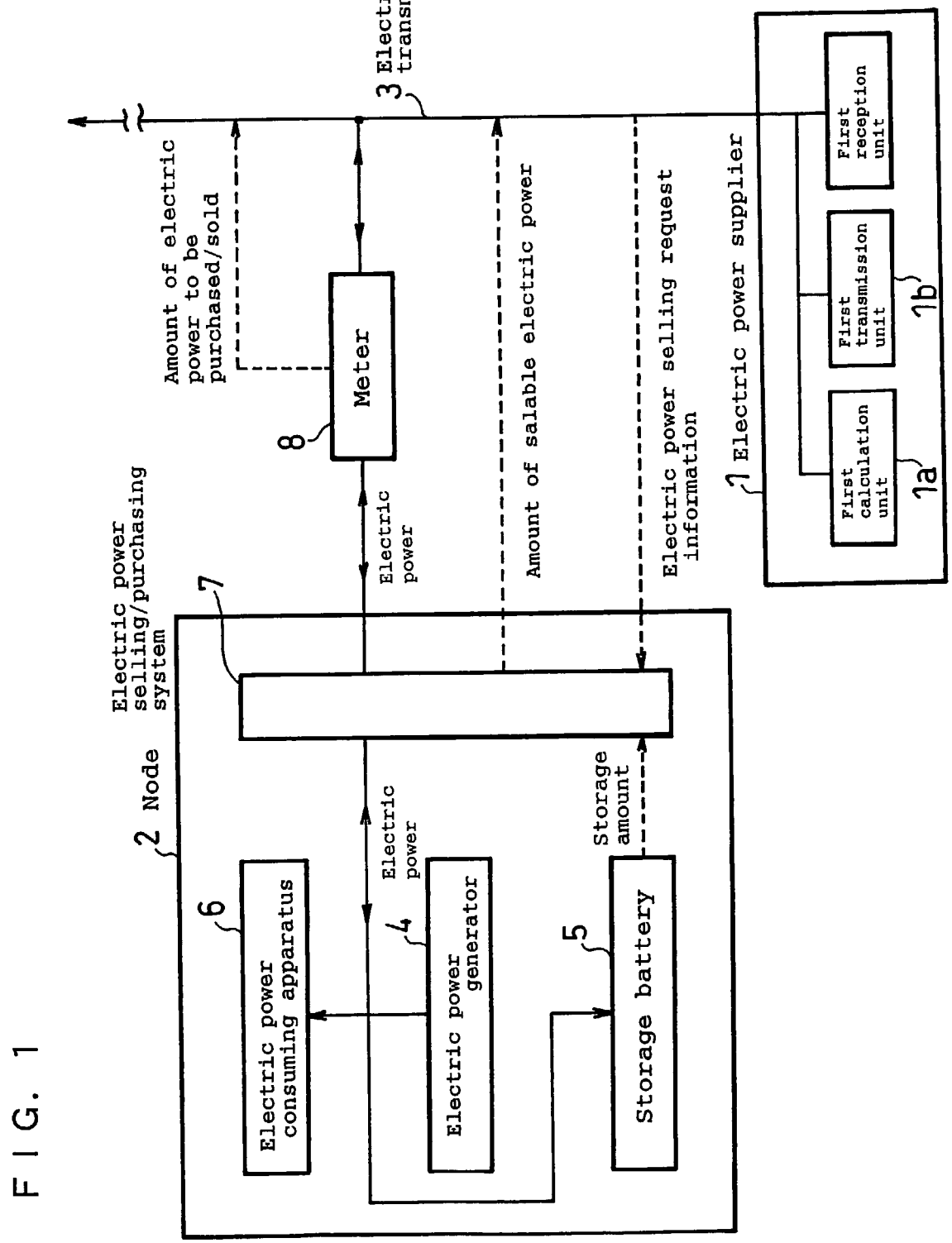
FIG. 1 is a view showing the configuration of an electric power supply and demand management system in accordance with Embodiment 1 of the present invention.

The present invention relates to an electric power supply and demand management system provided with an electric power supplier as typified by an electric power company, an electric power transmission system, electric power generators and electric power consuming nodes connected to the above-mentioned electric power transmission system and classified into a plurality of groups, and further provided with a first calculation unit for obtaining the difference between the total of electric power supplied from the electric power supplier to the node or the group and the total of electric power consumed by the electric power load of the node or the group and a first transmission unit for transmitting information for increasing/decreasing the amount of electric power supply so that the difference becomes smaller to the electric power supplier. Namely, the present invention relates to a system for managing the supply and demand of electric power between an electric power company and consumers having their own electric power generators.

The first calculation unit is mainly used to function for the electric power supplier and may be provided for any one of the electric power supplier, the electric power transmission system and the electric power consuming node. Furthermore, the first calculation unit may be provided for each group including a plurality of nodes.

When the information for increasing/decreasing the amount of electric power supplied so that the difference between the total of electric power supplied from the electric power supplier to the node or group and the total of electric power consumed by the electric power load of the node or group becomes smaller can be sent from the first transmission unit to the electric power supplier as described above, electric power generation at the electric power supplier can be carried out efficiently, thereby it is so effective. The electric power load means one or more electric power consuming apparatuses including electric appliances, such as a refrigerator, a washing machine, an air conditioner and a television set.

Next, it is effective that the first calculation unit determines at least one of a selling price of electric power from the electric power supplier to the node or the group and a purchase price of electric power from the node of the group to the electric power supplier, by using the difference between a total of electric power supply from the electric power supplier to the node or the group and a total of electric power consumed-by an electric power load at the node or the group as a parameter, and the first transmission unit transmits at least one of the selling price and the purchase price to the node or the group.

With this, each node or group, that is a consumer side, can purchase lacking electric power promptly and securely, and electric power additionally stocked in its electric power generator can be purchased by other nodes or the electric power supplier without wasting such an electric power, whereby the electric power supplier can manage the supply and demand of electric power efficiently.

Furthermore, it is effective that the electric power supplier has a reception unit for receiving information selected from the group consisting of an electric power charge, an amount of electric power consumption and an electric power supply capacity of the node or the group, the first calculation unit determines an amount of electric power and a purchase price of electric power demanded by the electric power supplier for each node, which can sell electric power among the nodes, on the basis of the information, and the first transmission unit transmits at least one of the amount of electric power and the purchase price demanded by the electric power supplier to the node.

With this configuration, depending on the actual condition of each node or group, electric power excessively generated by its electric power generator or stocked therein can be purchased by the electric power supplier without wasting the electric power, whereby the electric power supplier can manage the supply and demand of electric power more efficiently.

Hence, it is effective that the node or the group is provided with; a second transmission unit for transmitting information selected from the group consisting of an electric power charge, an amount of electric power consumption and an electric power supply capacity to the outside (other nodes, groups or said electric power supplier); a second reception unit for receiving information selected from the group consisting of an amount of electric power, a purchase price of electric power and a selling price of electric power demanded by the outside; and a control unit for controlling an output of the electric power generator of the node on the basis of the information.

In this way, if each node or group transmits the information selected from the group consisting of the electric power charge, the amount of electric power consumption and the electric power supply capacity to the outside by using the second transmission unit, the node or group can receive the information selected from the group consisting of the purchase price of electric power and the selling price of electric power from the outside by using the second reception unit, thereby the electric power generator thereof can be controlled securely without causing waste.

It is effective that the electric power supply and demand management system is provided with a node information storage unit for storing node information including a node identifier for identifying the node and an amount of electric power consumption and an amount of electric power supply of the node identified by the identifier, and that the first calculation unit calculates an amount of transmittable electric power from one node to other nodes and/or the electric power supplier by using the amount of electric power consumption and the amount of electric power supply included in the node information as parameters, the first transmission unit transmits a signal indicating the amount of transmittable electric power to each node, and the node transmits the transmittable electric power to the other nodes and/or the electric power supplier.

The above-mentioned node information storage unit may only be the so-called storage unit and may be provided for any one or more of the node, the group and the electric power supplier, and is mainly controlled by the above-mentioned electric power supplier. Furthermore, this node information storage unit is connected to the first calculation unit of the electric power supplier, and the first calculation unit calculates the amount of transmittable electric power from one node to other nodes by using the amount of electric power consumption and the amount of electric power supply included in the node information as parameters, whereby the amount of transmittable electric power can be transmitted from the one node to the other nodes. In other words, electric power generated or stocked excessively at each node can be used effectively at other nodes.

The electric power supplier may have a substation. In this case, it is effective that the first calculation unit calculates a purchase amount of electric power and a purchase price of electric power, which are demanded by the electric power supplier, by using electric power supply and demand information regarding a flowing direction and an amount of power (energy) between a high-voltage side to a low-voltage side of the substation, which may be measured by a magnetic field for example, and that the first transmission unit transmits the amount of electric power to be purchased and the purchase price to the node.

Hence, the electric power supplier can effectively use electric power depending on the condition of the substation thereof and the like and can effectively control the substation.

In addition, the node should preferably have a storage battery. In this case, each node can stock electric power by itself and can examine the selling time of the stocked electric power depending on the change in the price of electric power in the market including the other nodes and/or the electric power supplier.

In this case, it is effective that each node is provided with a second calculation unit for determining at least one selected from the group consisting of a purchase amount of electric power, a purchase price of electric power, a selling amount of electric power and a selling price of electric power, which are demanded for the other nodes, by using information regarding electric power demand and storage amounts of storage batteries connected to other nodes, because the second transmission unit can transmit the demanded amount of electric power and the purchase price of electric power to at least one of the electric power supplier and the other nodes.

Furthermore, it is effective that the first calculation unit or the second calculation unit predicts the amount of electric power consumption at a predetermined node or group and determines the amount of electric power supply to the predetermined node or group by using the predicted amount of electric power consumption as a parameter, and that the transmission unit or second transmission unit transmits a signal in order for to the electric power generator of a node or group other than the predetermined node or group to supply the amount of electric power.

In this case, it is effective that the electric power supply and demand management system is provided with electric power consumption amount storage means for storing information regarding an amount of electric power consumption of each node, and that the first calculation unit or the second calculation unit predicts an amount of electric power consumption of each node or each group by using the stored amount of electric power consumption as a parameter. The electric power consumption amount storage means may be provided at each node or the electric power supplier, or the node information storage unit may function as the electric power consumption amount storage means.

Moreover, it is effective that the first calculation unit or the second calculation unit determines the amount of electric power supply from the node by using data including the output of the electric power generator and the amount of fuel consumption required for the output as parameters.

Still further, it is effective that the first calculation unit or the second calculation unit determines the amount of electric power supply from the electric power generator by using at least the amount of electric power consumption at the node as a parameter.

It is effective that the first calculation unit or the second calculation unit determines the amount of electric power supply of each electric power generator so that the number of electric power generators in operation at the node becomes minimum or maximum.

It is effective that the first calculation unit or the second calculation unit predicts the amount of electric power consumption at each node by using information regarding the schedule of the components or the electric power consuming apparatuses at each node.

It is effective that, by using the storage amount of the storage battery or the transfer amount of electric power at each node, the first transmission unit or the second transmission unit transmits information for increasing/decreasing the amount of electric power supplied from the storage battery at the each node or the electric power generator connected to the storage battery to a node requiring the electric power. One calculation unit may function as the first calculation unit and the second calculation unit.

Hence, in the electric power supply and demand management system in accordance with the present invention, the electric power supplier may have the substation and the control unit in addition to the first calculation unit and the first transmission unit, and each node may have the second calculation unit, the second transmission unit, the storage battery and the control unit in addition to the electric power generator. The node information storage unit and the electric power consumption amount storage means may be provided anywhere if they are communicated electrically with each other.

All of these components are at least electrically connected and constitute the electric power supply and demand management system in accordance with the present invention. Furthermore, the electric power supply and demand management system in accordance with the present invention should only be provided with the minimum components corresponding to at least the functions and effects. Hence, components capable of attaining predetermined functions and effects can be combined appropriately, and the system may preferably have all the components.

Although typical examples of the electric power supply and demand management system in accordance with the present invention will be described below more specifically referring to the accompanying drawings, the present invention is not limited only thereto.

EMBODIMENT 1

Next, preferable embodiment in accordance with the present invention will be described referring to the drawings.

FIG. 1 is a view showing the configuration of an electric power supply and demand management system in accordance with Embodiment 1 of the present invention. The electric power supply and demand management system shown in FIG. 1 comprises an electric power supplier 1, n (n≧2) nodes 2 and an electric power transmission system 3, and the node 2 has an electric power generator 4, such as a fuel cell, a storage battery 5, and electric power consuming apparatuses 6, such as a refrigerator, a washing machine, an air conditioner and a television set, whereby temporary excessive or lacking electric power can be adjusted by the storage battery 5.

The electric power supplier 1 has a first calculation unit 1a for obtaining the difference between the total of electric power supplied from the electric power supplier 1 to the node 2 (or a group of a plurality of nodes 2) and the total of electric power consumed by electric power load at the node 2 (or a group of a plurality of nodes 2) and a first transmission unit for transmitting information for increasing/decreasing the amount of electric power supply so that the difference becomes smaller to the electric power supplier. Hence, the electric power supplier can efficiently control its own electric power generation.

In addition, by using the difference between the total of electric power supplied from the electric power supplier to the node or group and the total of electric power consumed by electric power load at the node or group as a parameter, the first calculation unit determines at least one of the selling price of electric power from the electric power supplier to the node or group and the purchase price of electric power from the node or group to the electric power supplier, and the first transmission unit transmits at least one of the selling price and purchase price to the node or group.

The storage battery 5 has an electric power storage unit for storing electric power and an electric power management unit (not shown) for managing the amount of the electric power stored in the electric power storage unit; the electric power management unit monitors the current flowing through the electric power storage unit, grasps electric power amount information, that is, information regarding the amount of electric power storage, and transmits the electric power amount information to an electric power selling/purchasing system 7. Hence, the electric power selling/purchasing system 7 may include a control unit, a second calculation unit, a second transmission unit and a second reception unit.

Furthermore, the electric power selling/purchasing system 7 receives the electric power storage amount of the storage battery and transmits the identification number of the node to which the system itself belongs, a salable amount of electric power, etc. to the electric power transmission system 3 by using small pulses. Moreover, a meter 8 provided for electric power lines led from electric power transmission lines constituting the electric power transmission system 3 into the node 2 transmits information regarding the identification number of the node 2, the salable amount of electric power and the purchasable amount of electric power (in other words, transfer amount information regarding the transfer amount of energy) to the electric power transmission system 3 by using small pulses. This meter 8 may be included in the electric power selling/purchasing system 7 as a matter of course.

The information transmitted by the electric power selling/purchasing system 7 used as the second transmission unit and the meter 8 is transmitted to other nodes, the above-mentioned group or the electric power supplier 1, and the electric power selling/purchasing system 7 finds out a node outputting an information signal meaning that electric power can be sold in accordance with the above-mentioned transmitted information near the node, from which electric power is purchased and transmits electric power selling request information (the request amount of electric power supply) to the node. For example, information regarding the identification number of the node requesting the selling of electric power and the amount of electric power requested to be sold is transmitted to the electric power transmission lines by using small pulses.

Furthermore, the electric power selling/purchasing system 7 monitors the pulses transmitted to the electric power transmission lines; when the electric power selling/purchasing system detects the identification number of the node to which the system itself belongs, it transmits the information subsequent thereto. If the information is electric power selling request information, electric power is transmitted to the electric power transmission lines in accordance with the information.

In the above-mentioned embodiment, the information transmitted by the electric power selling/purchasing system 7 is the electric power storage amount of the storage battery; however, without being limited to the electric power storage amount, the extra capacity of the electric power generator (the value obtained by subtracting the amount of electric power consumption predicted at present or in the future from the maximum output or the most efficient output of the electric power generator) may be transmitted. Both may also be transmitted as a matter of course.

Moreover, the available capacity of the storage battery (the amount of electric power that can be stored further in the storage battery, in other words, (the capacity of the storage battery)−(the electric power storage amount of the storage battery)), may be transmitted so that the selling of electric power from a node, in which its storage battery becomes full and its electric power is highly unlikely to be used effectively, has higher priority.

Still further, the capacity of the storage battery may be memorized in advance in an apparatus for determining the amount of electric power, which is sold by each anode, and both the value of the electric power storage amount and the available capacity of the storage battery may be used as information regarding the electric power storage amount of the storage battery to determine the amount of electric power to be sold from each node. If the available capacity of the storage battery is known, the amount of electric power unable to be stored in the storage battery and thus wasted can be reduced.

Still further, each node 2 is not always required to have the storage battery 5. When the node does not have the storage battery 5, electric power selling request information may be formed by using information regarding the electric power generator 4, such as the extra capacity of the electric power generator 4.

Still further, a node without the electric power generator 4 may also be used. In this case, the node should only be dealt with such that its salable amount of electric power is zero. In addition, in the above-mentioned embodiment, the salable amount of electric power and the purchasable amount of electric power (in other words, transfer amount information regarding the transfer amount of energy) to be transmitted from the meter 8 and the information regarding the salable amount of electric power (in other words, information regarding the electric power storage amount of the storage battery) to be transmitted from the electric power selling/purchasing system 7 are transmitted separately; however, both may be transmitted together by means of the electric power selling/purchasing system 7 and information can be transmitted efficiently by such a transmission.

Still further, in the above-mentioned embodiment, a signal indicating the amount of electric power that can be supplied is transmitted as information regarding the electric power supply capacity; however, only the information as to whether electric power can be supplied or not may be transmitted as information regarding electric power supply capacity from the anode 2, and only the information as to whether electric power is permitted to be sold or not may be received at the anode 2 as information for increasing/decreasing the electric power supply capacity.

Still further, in the above-mentioned embodiment, information is transmitted via the electric power transmission system by using the electric power transmission lines; however, without being limited thereto, the telephone lines, wireless transmission or the lines of AC electric power sources may also be used, for example. When using the electric power transmission lines, the lines are advantageous since it is not necessary to prepare new transmission lines and the like. On the other hand, when not using the electric power transmission lines, this method is advantageous since information transmission is possible even when the electric power transmission lines are affected by trouble, such as a thunderbolt.

EMBODIMENT 2

Figure 2:
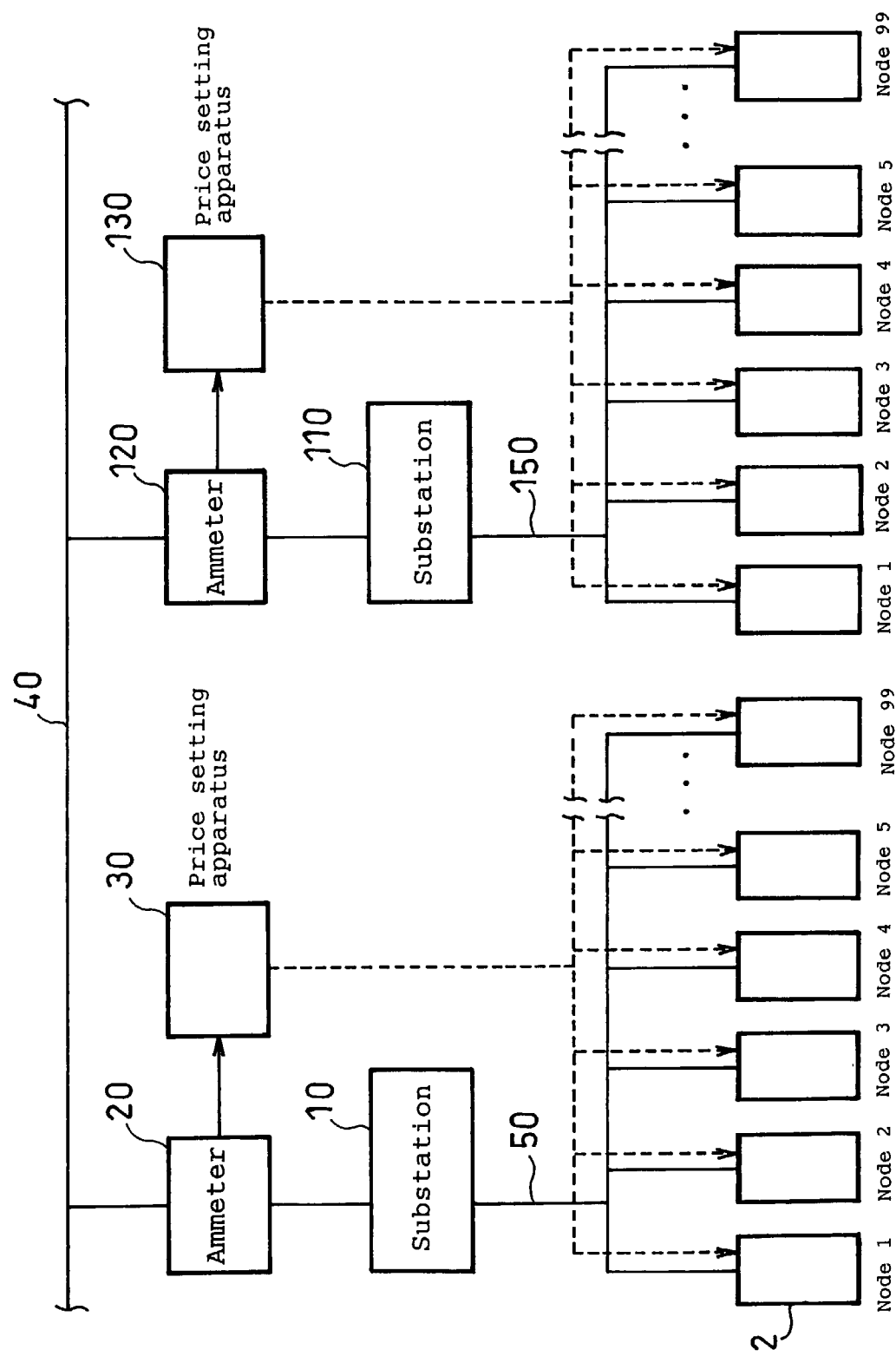
FIG. 2 is a view showing the configuration of an electric power supply and demand management system in accordance with Embodiment 2 of the present invention.

FIG. 2 is a view showing the configuration of an electric power supply and demand management system in accordance with Embodiment 2 of the present invention. In FIG. 2, electric power transmission lines 40 are high-voltage electric power transmission lines and have a high voltage in order to efficiently transmit electricity from an electric power supplier, such as a thermal electric power station, to nodes 2, such as residential areas. Electric power transmission lines 50 and electric power transmission lines 150 are transmission lines for transmitting a voltage to be supplied to each node; for example, the voltage is controlled so as to be maintained at a constant voltage in the range of about 100 to 220 V.

A substation 10 belonging to the electric power supplier is provided between the electric power transmission lines 40 and the electric power transmission lines 50 and transforms the voltage across the electric power transmission lines 40 to the voltage across the electric power transmission lines 50.

The relation between the electric power transmission lines 40 and the electric power transmission lines 150 is similar to that described above. To the substation 10, 99 numbers of nodes 2 are connected, whereby electric power can be sold or purchased. The amount of electric power transformed by the substation can be measured by an ammeter 20, and the result of the measurement (in other words, electric power demand information regarding the movement direction and the amount of electric energy flowing through the electric power transmission lines) is sent to a salable electric power price setting apparatus 30. This ammeter 20 and the price setting apparatus 30 constitute the first calculation unit or the second calculation unit.

When energy flows from the electric power transmission lines 50 to the electric power transmission lines 40, the price setting apparatus 30 lowers the selling price of electric power having been set at present (in other words, information for increasing/decreasing the amount of electric power to be sold by each node), and notifies the price to the 99 numbers of nodes 2. In the case when the electric power generation cost at the node 2 itself is higher than the selling cost of the electric power, the output of its electric power generator is lowered or the electric power generator is stopped, whereby the sale of electric power can be stopped. This can prevent the sale of electric power from a region to which electricity is supplied from the substation 10.

On the other hand, when energy flows from the electric power transmission lines 40 to the electric power transmission lines 50, the price setting apparatus 30 raises the selling price of electric power having been set at present, and notifies the selling price to the 99 numbers of nodes 2. However, when the price-is close to the price of electricity that can be supplied by another means, such as a means for obtaining electricity from a thermal electric power station or the like through the electric power transmission lines 40, the selling price of electric power is not raised.

In the case when the electric power generation cost at each of the 99 numbers of nodes 2 is lower than the selling price of the electric power, the output of its own electric power generator is raised or the electric power generator is activated, whereby the sale of electric power can be started. This can promote the sale of electric power from the region to which electricity is supplied from the substation 10.

As described above, the amount of energy (electric power) passing through the substation 10 decreases, whereby the electric power transmission loss between substations or between a substation and an electric power station can be reduced. Furthermore, this relation is similar to the relation among a substation 110, an ammeter 120, a price setting apparatus 130, the electric power transmission lines 40, the electric power transmission lines 150 and nodes 101 in another group. In other words, by dividing a plurality of nodes into a plurality of groups and by balancing the supply and demand of electric power in each group, it is possible to reduce the electric power transmission loss of the whole system.

In the case when the difference between the price set by the price setting apparatus 30 and the price set by the price setting apparatus 130 is larger than the total electric power transmission loss of the substation 10, the electric power transmission lines 40 and the substation 110, the price at each node may be set referring to the preset price at another node. For example, in the case when the price set by the price setting apparatus 130 becomes larger than the sum of the price set by the price setting apparatus 30 added to the total electric power transmission cost of the substation 10, the electric power transmission lines 40 and the substation 110, the selling price of electric power is set as described below.

(1) When electric power flows from the electric power transmission lines 40 to the electric power transmission lines 50, the price setting apparatus 30 raises the selling price of electric power.

(2) When electric power flows from the electric power transmission lines 150 to the electric power transmission lines 40, the price setting apparatus 130 lowers the selling price of electric power.

(3) In the cases other than the cases (1) and (2), and in the case when the total of the amount of electric power flowing from the electric power transmission lines 40 to the electric power transmission lines 150 (this becomes a minus value when electric power flows from the electric power transmission lines 150 to the electric power transmission lines 40) and the amount of electric power flowing from the electric power transmission lines 40 to the electric power transmission lines 50 is larger than zero, the price setting apparatus 30 raises the selling price of electric power.

(4) In the cases other than the cases (1) and (2), and in the case when the total of the amount of electric power flowing from the electric power transmission lines 150 to the electric power transmission lines 40 (this becomes a minus value when the electric power flows from the electric power transmission lines 40 to the electric power transmission lines 150) and the amount of electric power flowing from the electric power transmission lines 50 to the electric power transmission lines 40 is larger than zero, the price setting apparatus 30 lowers the selling price of electric power.

In the above-mentioned embodiment, the supply and the demand of electric power are balanced by changing the selling price of electric power used as information for increasing/decreasing the amount of electric power supply; however, the supply and the demand may be balanced by changing the purchase price of electric power used as information for increasing/decreasing the amount of electric power supply or by changing both the selling price and the purchase price of electric power used as information for increasing/decreasing the amount of electric power supply.

EMBODIMENT 3

FIG. 3 is a view showing the configuration of an electric power supply and demand management system in accordance with Example 3 of the present invention. Example 3 shown in FIG. 3 is the same as Example 1 in that each node has electric power consuming apparatuses, an electric power generator and a storage battery, but different in that the electric power selling/purchasing system 7 used as a second calculation unit determines the selling price of electric power.

The electric power selling/purchasing system 7 sets the selling price of electric power on the basis of information, such as the current electric power supply capacity and the electric power storage amount stored in the storage battery. For example, the selling price of electric power may be set by subtracting a constant value from a limit cost per unit of electric power of the present electric power generator, or the selling price of electric power may be set lower on the basis of the electric power storage amount of the storage battery when the electric power storage amount is large.

The electric power selling/purchasing system 7 converts information for identifying the node to which the system itself belongs and information regarding the selling price of electric power and the salable amount of electric power into pulse signals and transmits the signals as electric power selling bid information to the electric power transmission system 3. The electric power selling bid information is collected at one location or at each region and received by nodes or electric power suppliers demanding electric power; these nodes and electric power suppliers competitively transmit electric power selling request information (successful bid information) to the node that transmitted the above-mentioned electric power selling bid information.

In other words, in the electric power supply and demand management system of the present invention, a node requiring electric power compares the selling prices of electric power presented by electric power suppliers and other nodes capable of selling electricity from their electric power generators, thereby being able to acquire electric power at a lower price.

An example of a method of retrieving bid information stating that a node requiring electric power purchases (is supplied with) electric power at a low price will be described. For example, a table comprising bid information including the identification number of each node, selling price of electric power and salable amount of electric power is prepared as shown in FIG. 4. The node requiring electric power is then subjected to the following processing.

First, values are obtained by dividing the selling price of electric power at each node capable of selling electric power by its electric power transmission efficiency, and a node X having the minimum value is found out. The electric power transmission efficiency can be obtained by (the amount B of electric power receivable by a node that receives electric power)/(the amount A of electric power transmitted by a node that sells electric power). Furthermore, the increase of the amount of electric power, which is converted into heat owing to change in current, the resistance of transmission lines and the like during electric power transmission from an electric power selling node to a node requiring electric power, becomes A-B.

In the case when the amount of electric power that can be supplied (sold) by the node X is larger than the value obtained by dividing the amount of electric power, which is required by a node demanding electric power, by the electric power transmission efficiency, a value obtained by dividing the required amount of electric power by the electric power transmission efficiency is added to the selling amount of electric power (bid information) requested to the node X.

On the other hand, in the case when the amount of electric power that can be supplied (sold) by the node X is smaller than the value obtained by dividing the amount of electric power, which is required by a node demanding electric power, by the electric power transmission efficiency, the amount of electric power that can be supplied is added to the selling amount of electric power (bid information) requested to the above-mentioned node X.

The required amount of electric power can be obtained by ((the amount of electric power required by a node demanding electric power)−(the selling amount of electric power requested to a node selling electric power))×(electric power transmission efficiency).

Next, a similar calculation is carried out for nodes wherein values obtained by dividing the selling prices of electric power by the electric power transmission efficiency are small, and this calculation is repeated until the required amount of electric power becomes zero. After the above calculation is completed for all nodes demanding electric power, the selling amounts of electric power (bid information) are transmitted to all the nodes requesting the sale of electric power via the electric power transmission system. Hence, electric power is sold to nearby nodes demanding electric power, whereby the sale and purchase of electric power can be done efficiently.

EXAMPLE 4

FIG. 5 is a view showing the configuration of an electric power supply and demand management system in accordance with Embodiment 4 of the present invention. Embodiment 4 shown in FIG. 5 is the same as Embodiment 1 in that each node has electric power consuming apparatuses, an electric power generator and a storage battery, but different in that the operation of the electric power selling/purchasing system is determined depending on voltage by using the fact that the voltage changes depending on electric power supply and demand situation. In other words, the voltage lowers when electricity is supplied to a nearby node via the transmission lines, and the voltage rises when electricity is supplied reversely; hence, electric power may be sold when the voltage is low, and electric power may be prevented from being sold when the voltage is high.

More specifically, the electric power selling/purchasing system 7 determines as to whether electric power is sold or not depending on the electric power storage amount at the storage battery 5 and the voltage signal from a voltmeter 9, and also determines the amount of electric power to be sold, and then sell the electric power. As a result, electric power can be sold when electric power is demanded near the node, whereby electric power can be used efficiently as a whole in the electric power supply and demand management system.

In addition, when distributed processing is carried out at each node as in the example, even if an accident occurs, for example if a part of the electric power transmission lines of the electric power transmission system is cut off, the electric power supply and demand management system is controlled so that supply and demand are balanced automatically at portions connected by the electric power transmission lines, thereby being advantageous.

In the case when the voltmeter 9 does not operate accurately, there is danger that nodes selling electric power might be concentrated on limited nodes. For example, in the case when it is set that electric power is sold when the voltages of the electric power transmission lines connected to two adjacent nodes are almost the same and when the voltages at the two nodes are constant (for example 100 V) or more, the selling of electric power from the node, the measured voltage of which is slightly lower, has higher priority.

Figure 6:
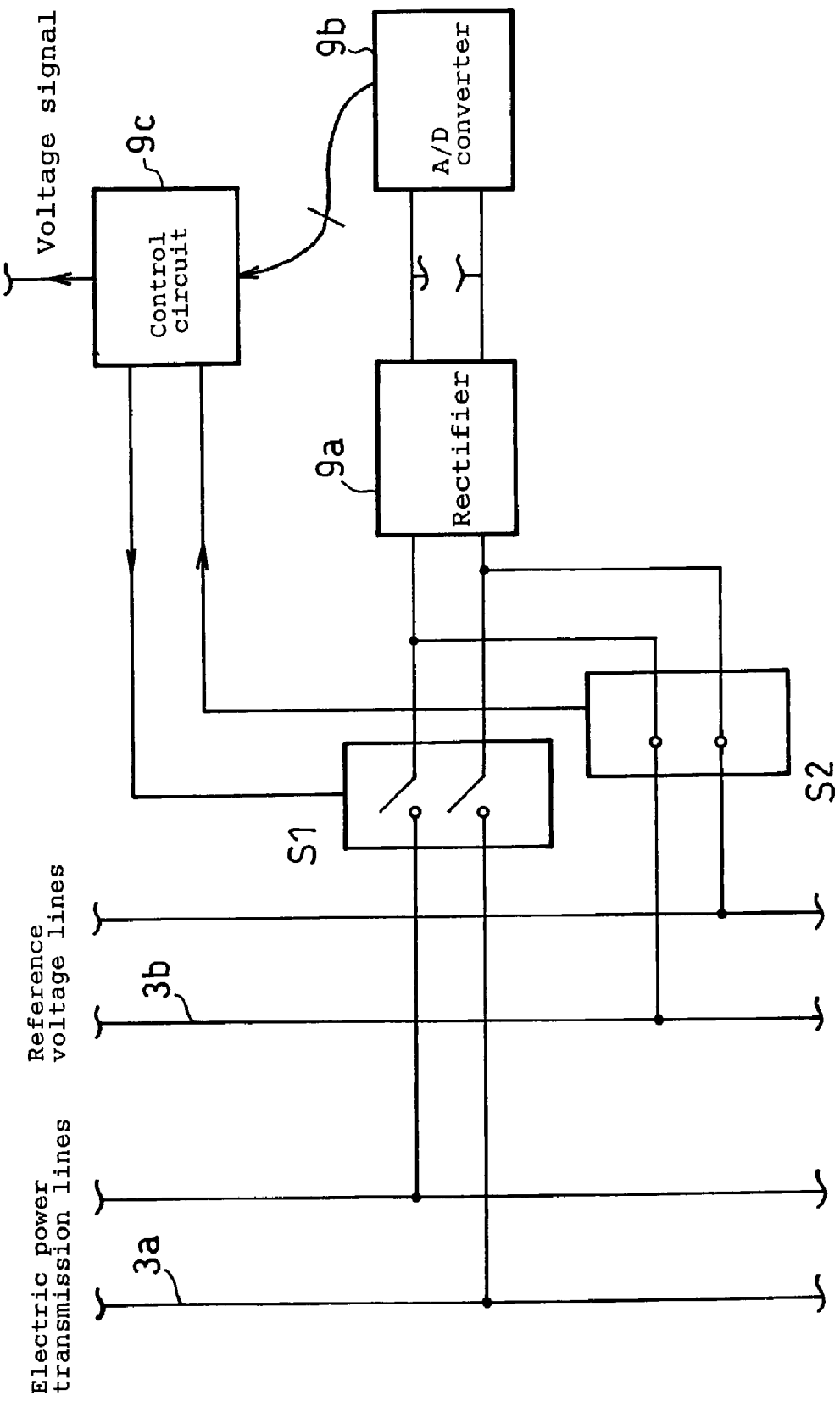
FIG. 6 is a view showing the configuration of an example of a circuit for accurately measuring voltage.

To solve the above-mentioned problem, electric power should be sold by further considering the amount of electric power stored in the storage battery or the voltage should be measured accurately. FIG. 6 is a view showing the configuration of an example of a circuit for measuring the voltage accurately. In FIG. 6, reference voltage (the desirable voltage of the electric power transmission lines) lines 3b as well as electric power transmission lines 3a in the electric power transmission system are connected to the voltmeter 9 of each node. A switch S1 and a switch S2 are switches for connecting the electric power transmission lines 3a or the reference voltage lines 3b to a rectifier 9a. Alternating current from the electric power transmission lines 3a or the reference voltage lines 3b is rectified to direct current by the rectifier 9a and converted into a digital signal representing a voltage by an analog/digital converter 9b. A control circuit 9c transmits a voltage signal obtained by dividing the voltage value across the electric power transmission lines 3a by the reference voltage value to the electric power selling/purchasing system 7. Since the electric power transmission lines 3a and the reference voltage lines 3b are measured by using the same rectifier 9a and the analog/digital converter 9bid is possible to obtain signals wherein errors due to variations in parts and the like are cancelled.

EMBODIMENT 5

Figure 7:
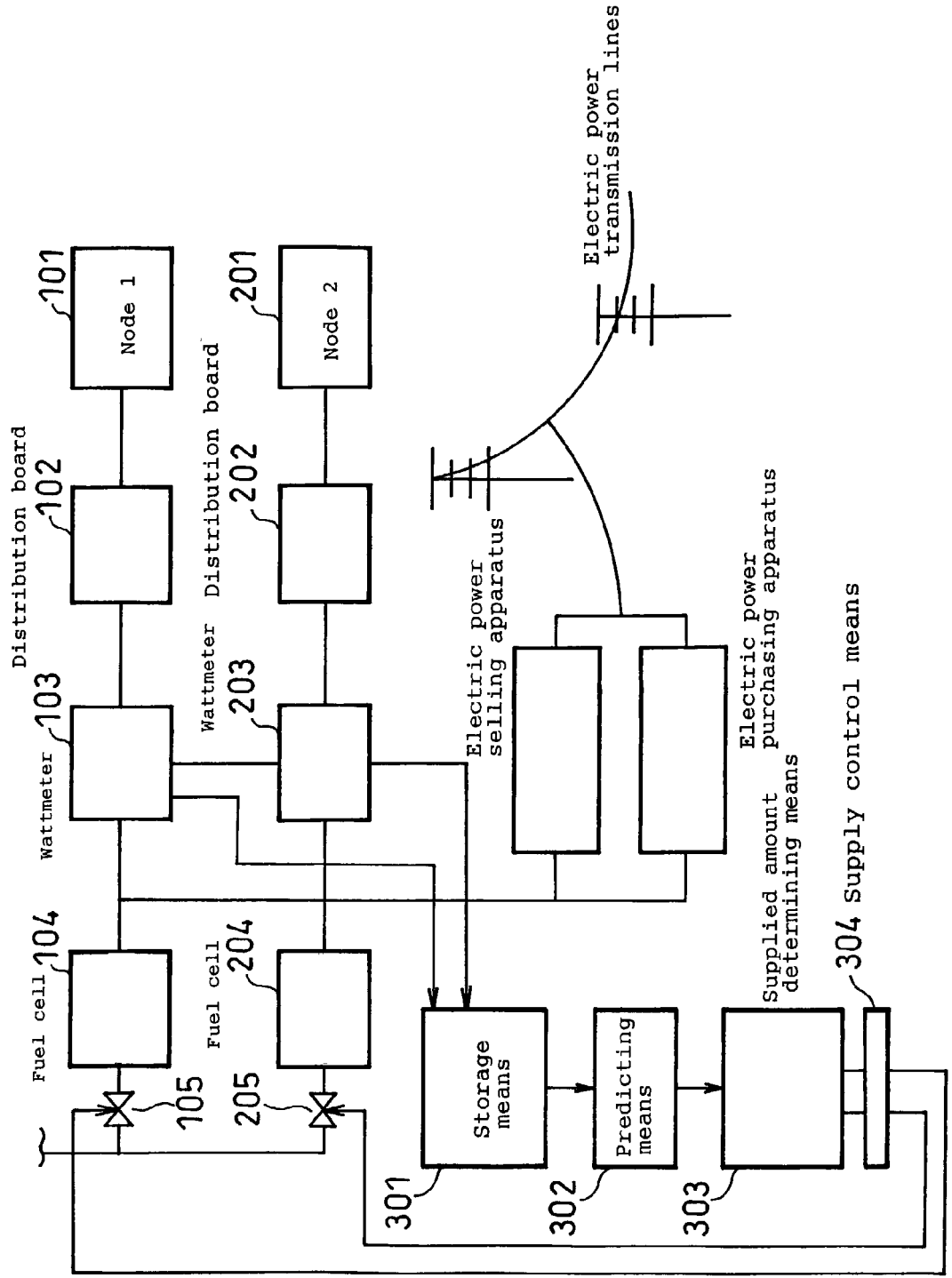
FIG. 7 is a view showing the configuration of an electric power supply and demand management system in accordance with Embodiment 5 of the present invention.

FIG. 7 is a view showing the configuration of an electric power supply and demand management system in accordance with Embodiment 5 of the present invention. In the electric power supply and demand management system of this embodiment, twp nodes 101 and 201 are included in one group. In FIG. 7, a fuel cell 104 and a fuel cell 204 used as electric power generators are shown separately from the node 101 and the node 201, respectively, for the sake of convenience; however, they are included in the node 101 and the node 201, respectively, actually.

Furthermore, when the amounts of electric power consumption at the nodes are measured by electric power distribution boards 102 and 202, respectively, as shown in FIG. 7, an electric power consuming apparatus, which receives electric power supplied from the corresponding distribution board, or a set of such electric power consuming apparatuses becomes a node; this is advantageous in that the amounts of electric power consumption of the electric power consuming apparatuses, which are physically adjacent to each other, that is, have the same electric power transmission loss on the basis of a certain fuel cell, can be measured together. For example, nodes having higher electric power transmission efficiency by electric power transmission from the fuel cell 204 rather than by electric power transmission from the fuel cell 104 can be measured together by a wattmeter 203. The amounts of electric power consumption of the node 101 and the node 201 are measured by a wattmeter 103 and the wattmeter 203, which are measurement means, respectively.

The wattmeter may perform measurement by counting the number of revolutions of a disc, which rotates depending on the amount of electric power consumption, or by calculating the sum of current values, which are obtained by measuring current or the like, with the use of an AD converter at constant time intervals. Data measured by the wattmeter 103 and the wattmeter 203 is transmitted to a storage means 301, which is a storage unit, and stored therein.

Figure 8:
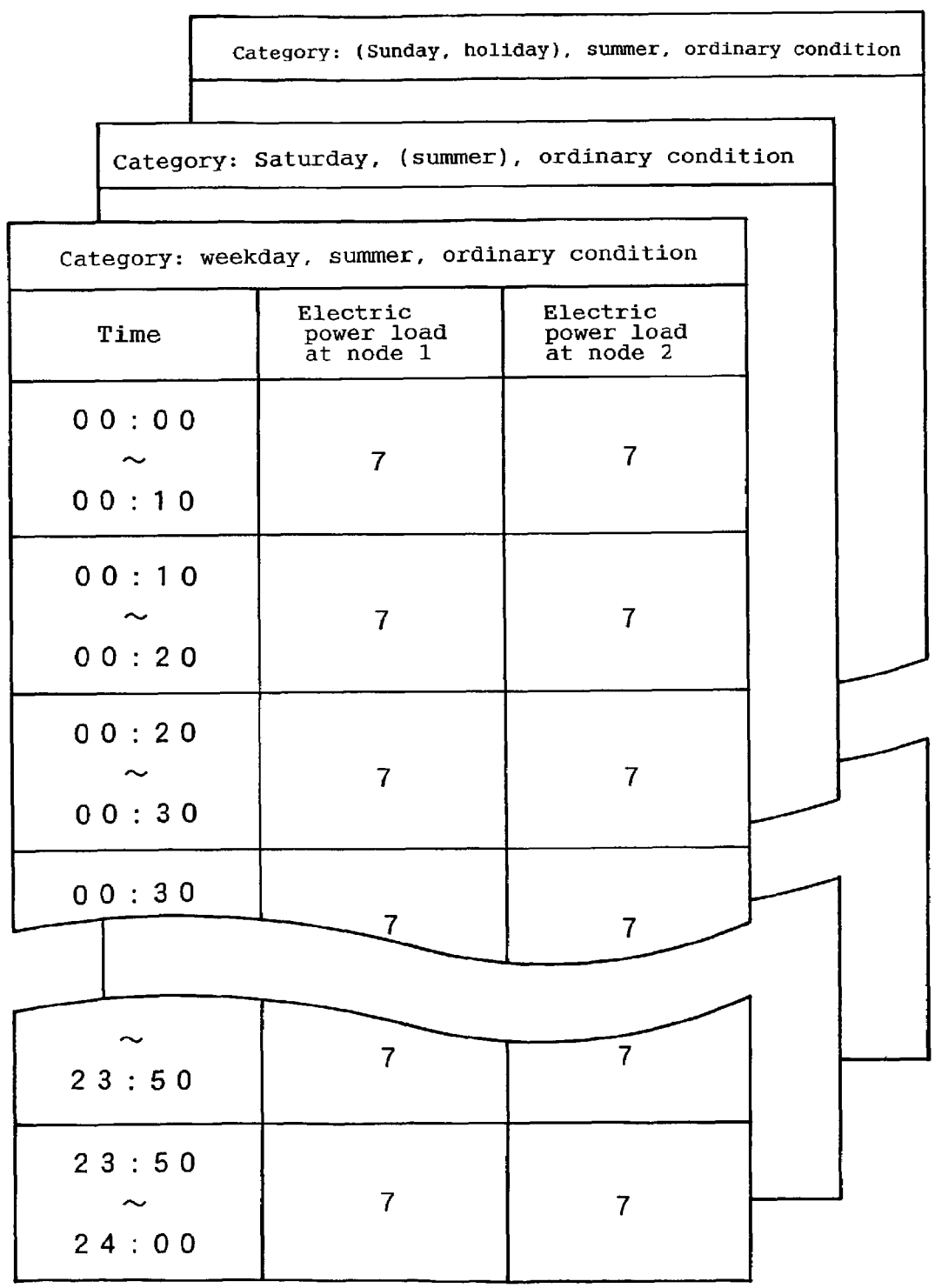
FIG. 8 is a view showing an example of a table of the amount of electric power consumption memorized in storage means in every time zone.

The storage means 301 memorizes the amount of electric power consumption in every time zone as a table as shown in FIG. 8, for example. Since the capacity of the storage means 301 is limited, when the free space of the storage area thereof is lost or becomes small, new data (current data) is stored while older data is deleted. The data recorded in the storage means 301 is read by predicting means 302 and used as a parameter for predicting the amount of electric power consumption. The first calculation unit or the second calculation unit may be used to function as the predicting means 302 and supplied amount determining means 303.

The amount of electric power consumption is predicted as described below. For example, when the node is a general household and no data is available in the storage means 301 (for example, immediately after the control apparatus is installed), a standard electric power charge obtained depending on the number of family members, family structure, season, etc. is used as it is. When data for one or more days is stored in the storage means 301, the amount of electric power consumption can be predicted by averaging data in the same time zone. Furthermore, the hour of rising and the number of family members at home are different depending on weekday or holiday; therefore, the amount of electric power consumption can be predicted accurately by averaging past electric power charges depending on weekday, holiday or a day of week.

In addition, the amounts of electric power consumption of an air conditioner and the like differ depending on the season; hence, the amounts of electric power consumption can be predicted highly accurately by averaging the amounts of electric power consumption every season, by deleting the data of the amounts of electric power consumption in a certain period of the past or by not using the data of the amounts of electric power consumption in a certain period of the past when taking an average. Furthermore, the amounts of electric power consumption differ depending on weather; hence, the amounts of electric power consumption can be predicted highly accurately by averaging the amounts of electric power consumption depending on the weather conditions. Moreover, the amounts of electric power usage differ depending on the schedule information of each day (for example, nobody at home because of travel, no school because of summer vacation, returning home late, visitors at home, etc.); hence, the amounts of electric power consumption can also be predicted highly accurately by dividing the schedule information into a plurality of categories and by taking an average for each category.

The categories are assumed to be weekday and holiday; spring, summer, fall and winter; school day or no school day; weather; visitors at home or not; plan to go out; plan to take a bath; and other situations affecting the amounts of electric power consumption and the combinations of them. The schedule information may be input from a personal computer or the like, which is used as a control unit for managing a schedule at each node and connected to the electric power supply and demand management system, or may be received from the electric power supplier.

Furthermore, information estimated from the amount of electric power consumption in the morning or the like may be used as the schedule information. In other words, for example, since the hour of rising is late during a holiday, if the amount of electric power consumption, which would begin to increase at a certain time of the day in the case of a weekday, remains small, it may be judged that today is a holiday; or it may be judged that nobody is at home if the home security system is in its absent mode.

Moreover, the amounts of electric power consumption of the past may be categorized as described above and they may be reflected to the schedule information; furthermore, the amount of electric power consumption predicted as described above may be changed by using the schedule information. For example, in the case when a resident was not at home until 18:00 and he returned at 18:00, an air conditioner or the like is turned on, whereby the amount of electric power consumption increases usually; hence, the final amount of electric power consumption may be obtained by averaging the amounts of electric power consumption of the past in the case when he is at home all day and by adding the amount of electric power consumption predicted to increase (the amount of increase) to the average.

The amount of increase to be added differs depending on season; hence, it may be based on data prepared for each category, may be obtained from a predetermined calculation formula by using a parameter affecting the amount of electric power consumption, such as temperature and weather, or may be obtained by averaging actual measurement values.

The above-mentioned actual measurement values are obtained as described below, for example. Namely, the average of the actual measurement values of the amounts of electric power consumption in the case when the resident is at home all day and the actual measurement value of the amount of electric power consumption during a certain time having passed after the resident returned home in the middle of the day are obtained, and the difference between the above average value and the actual measurement value is memorized. The average of the differences obtained in the same manner in the same category is used as the amount of increase to be added. As described above, the supplied amount determining means 303 determines the supplied amount of electric power on the basis of the amount of electric power consumption predicted by the predicting means 302.

Since two fuel cells are used in the electric power supply and demand management system shown in FIG. 7, the supplied amount of electric power from each fuel cell differs depending the characteristic of the fuel cell and an electric power transmission loss between the fuel cell to the node. In the case when the node 101 is distant from the node 201 and when an approximate efficiency is determined by the electric power transmission loss between the node 101 and the node 201, the predicted amounts of electric power consumption at the node 101 and the node 201 may be used directly as the supplied amounts of electric power of the fuel cell 104 and the fuel cell 204 as a general rule. Furthermore, in the case when the amount of electric power consumption predicted at each node exceeds the electric power supply capacity of its fuel cell, electric power may be supplied from the fuel cell of the other node.

For example, in the case when the output of the fuel cell at one of the nodes is small, the characteristic of the fuel cell is efficient and the electric power transmission loss between the node 101 and the node 201 is small, both the fuel cells may always be activated, whereby the electric power may be distributed to the two nodes equally. In other words, a plurality of fuel cells are activated and managed in a group and necessary electric power is supplied to the nodes in the group. In this case, the amount of electric power consumption measured by the wattmeter 103 may be added to that measured by the wattmeter 203, and the total may be stored in the storage means 301.

On the other hand, in the case when the output of the fuel cell at one of the nodes is large, the characteristic of the fuel cell is efficient, the electric power transmission loss between the node 101 and the node 201 is small and necessary electric power can be supplied only by activating one of the fuel cells, only the fuel cell belonging to the node, wherein the predicted amount of electric power consumption is larger, may be activated to supply electric power.

Alternatively, data representing the relation between the output of an electric power generator and the usage amount of fuel (for example, data shown in FIG. 10) may be memorized, and the most suitable amount of electric power generation of each fuel cell may be obtained by calculation or simulation from the memorized content. Furthermore, since the amount of change per hour in the amount of electric power supply of the fuel cell has a limit, the amount of electric power supply may be determined so that the amount of the change is a predetermined value or less.

Next, a supply control means 304 operated valves 105 and 205 for fuel, such as gas depending on the supplied amount determined by the supplied amount determining means 303. Since the output of the fuel cell does not increase immediately after the valve for fuel, such as gas, is opened, the amount of operation of the fuel valve is determined on the basis of the amount of electric power supply for the next two hours. Furthermore, in the above-mentioned embodiment, the amount of electric power consumption once measured is memorized, the memorized content is read and the amount of electric power consumption is predicted; however, the method described below may also be used.

Namely, the standard amount of electric power consumption for a day is memorized in the storage means 301 first. When the measurement result of the amount of usage is received, $z=ay+x(1-a)$ is obtained by using the amount x of electric power consumption at that time and the amount y of electric power consumption measured at the present time from the contents memorized in the storage means 301, and z at that time is memorized instead of x in the storage means 301 (a is a predetermined coefficient satisfying the relation $0<a<1$).

The amount of electric power consumption can be predicted by using the contents stored in the storage means 301. In this manner, averaging can be carried out while highly weighting measurement data, which are obtained at times close to one another, thereby being advantageous in that only a small amount of storage capacity is required. Furthermore, in the above-mentioned embodiment, the amount of electric power consumption was measured and the amount of electric power consumption was predicted by using the measurement value; however, it is not always necessary to measure the amount of electric power consumption, but the standard amount of electric power consumption may be directly used as the predicted value of the amount of electric power consumption.

Still further, in the above-mentioned embodiment, a case wherein fuel cells are controlled was explained; however, the electric power generators are not limited to the fuel cells, but other types of electric power generators, such as gas turbines, may be controlled. The present invention is particularly effective when controlling an electric power generator that cannot change its amount of electric power supply in a short time.

EMBODIMENT 6

Figure 9:
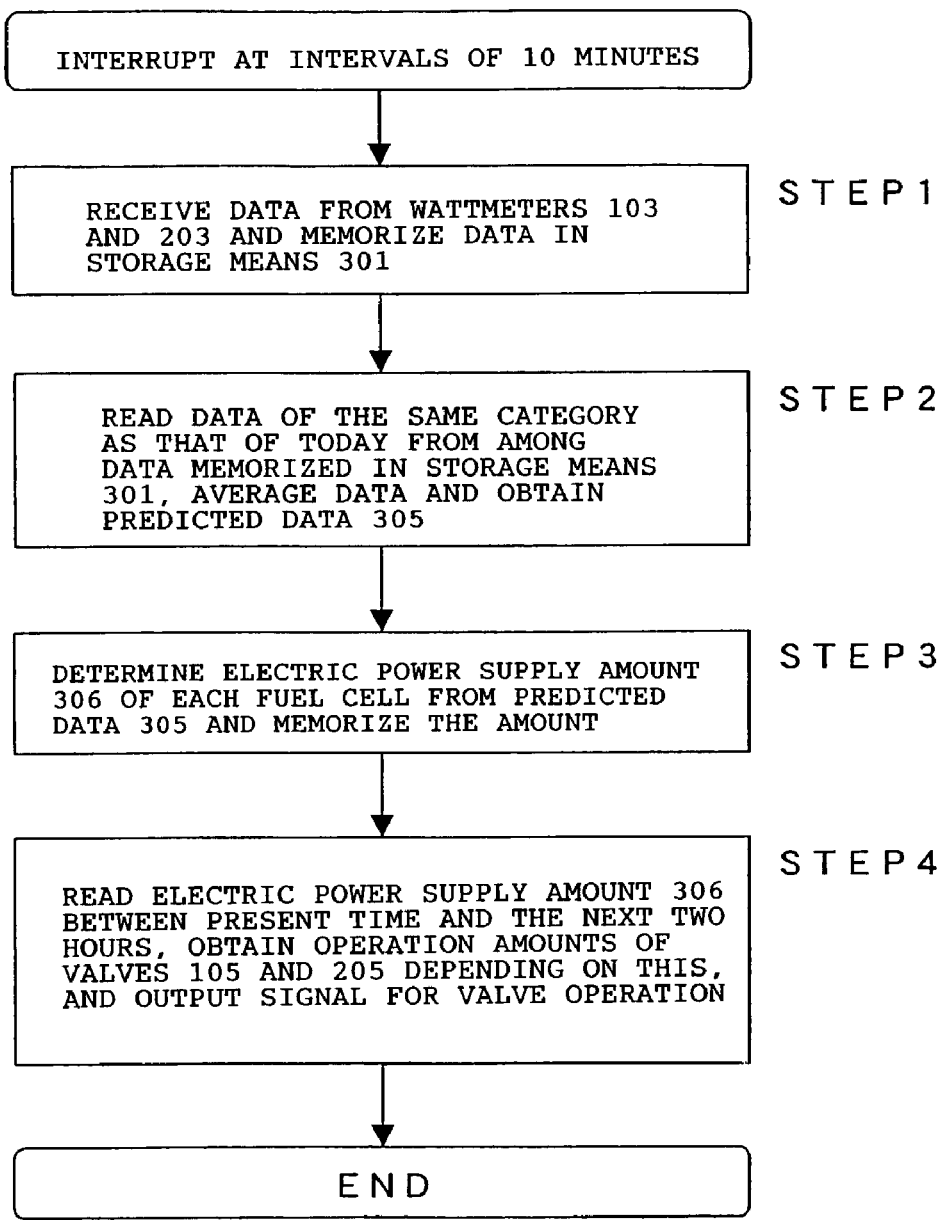
FIG. 9 is the flowchart of a program for determining the operation of a CPU.

The above Embodiment 5 in accordance with the present invention can be attained with the use of circuits; however, the present invention can also be attained with the use of a CPU, memory and peripheral circuits. In this case, the flowchart of a program for determining the operation of the CPU is shown in FIG. 9. Step 1 is to realize the storage means 301, step 2 is to realize the predicting means 302, step 3 is to realize the supplied amount determining means 303, and step 4 is to realize the supply control means 304. These steps are not always required to be carried out in the above order. Furthermore, operation is carried out at intervals of 10 minutes in FIG. 9; however, the operation may be carried out at intervals other than 10 minutes, and the operation may be carried out at intervals different from one another.

For example, step 1 to step 4 may be carried out as four processes independent from one another. In other words, process 1 and process 4 may be carried out at intervals of 10minutes, and process 2 and process 3 may be carried out in time zones (for example at night) during which the CPU is idle.

Furthermore, programs (any programs, such as source programs, object programs, etc., regardless of the type of execution) for activating the CPU are stored on a recording medium that can be read by a computer, and then transferred (sold), or only the contents of the programs are distributed via communication lines, and the contents are finally stored in memory constituting an electric power supply control apparatus, whereby the electric power supply control apparatus can be realized.

INDUSTRIAL APPLICABILITY

The present invention can provide an electric power supply and demand management system and energy management system capable of efficiently controlling and managing the supply and demand of electric power while reducing electric power transmission loss by selecting a node that can sell electric power from the electric power generator thereof to an electric power supplier depending on the demand of the node.

Furthermore, the present invention can provide an electric power supply and demand management system that can allow a fuel cell used as an electric power generator to generate an appropriate amount of electric power, not excessive or lacking.

The invention claimed is:

1. An electric power supply and demand management system comprising:
   an electric power supplier;
   an electric power transmission system;
   electric power consuming nodes, each having an electric power generator, connected to said electric power transmission system and classified into groups, each comprising a plurality of nodes;
   a first calculation unit configured to obtain a difference between a total of electric power supplied from said electric power supplier to said node or said group and a total of electric power consumed by an electric power load of said node or said group; and
   a first transmission unit configured to transmit information for increasing/decreasing an amount of electric power supply to said electric power supplier so that said difference becomes smaller,
   wherein said first calculation unit determines at least one of a selling price of electric power from said electric power supplier to said node or said group and a purchase price of electric power purchased from said node or said group and sold to said electric power supplier, by using said difference between a total of electric power supply from said electric power supplier to said node or said group and a total of electric power consumed by an electric power load at said node or said group as a parameter, and
   said first transmission unit transmits at least one of said selling price and said purchase price to said node or said group,
   wherein said electric power supplier has a reception unit configured to receive information selected from the group consisting of an electric power charge, an amount of electric power consumption and an electric power supply capacity of said node or said group,
   said first calculation unit determines an amount of electric power and a purchase price of electric power demanded by said electric power supplier for each node, which can sell electric power among said nodes, on the basis of said information selected from the group consisting of an electric power charge, an amount of electric power consumption and an electric power supply capacity of said node or said group, and
   said first transmission unit transmits at least one of said amount of electric power and said purchase price demanded by said electric power supplier to said node.

2. The electric power supply and demand management system in accordance with claim 1, wherein said node or said group is provided with;
   a second transmission unit configured to transmit information selected from the group consisting of an electric power charge, an amount of electric power consumption and an electric power supply capacity to other nodes, groups or said electric power supplier;
   a second reception unit configured to receive information selected from the group consisting of an amount of electric power, a purchase price of electric power and a selling price of electric power demanded by said other nodes, groups or said electric power supplier; and
   a control unit configured to control an output of said electric power generator of said node on the basis of said information.

3. The electric power supply and demand management system in accordance with claim 2, comprising,
   a node information storage unit configured to store node information including a node identifier for identifying said node and an amount of electric power consumption and an amount of electric power supply of said node identified by said identifier, wherein
   said first calculation unit calculates an amount of transmittable electric power from one node to other nodes and/or said electric power supplier by using said amount of electric power consumption and said amount of electric power supply included in said node information as parameters,
   said first transmission unit transmits a signal indicating said amount of transmittable electric power to each node, and
   said node transmits said transmittable electric power to the other nodes and/or said electric power supplier.

4. The electric power supply and demand management system in accordance with claim 1, wherein said electric power supplier has a substation,
   said first calculation unit calculates a purchase amount of electric power and a purchase price of electric power, which are demanded by said electric power supplier, by using electric power supply and demand information regarding a flowing direction and an amount of energy between a high-voltage side to a low-voltage side of said substation, and
   said first transmission unit transmits said amount of electric power to be purchased and said purchase price to said node or said group.

5. The electric power supply and demand management system in accordance with claim 1, wherein
   said node is provided with a storage battery, and a second calculation unit configured to determine at least one selected from the group consisting of a purchase amount of electric power, a purchase price of electric power, a selling amount of electric power and a selling price of electric power, which are demanded for said other nodes, by using information regarding electric power demand and storage amounts of storage batteries connected to other nodes, and
   said second transmission unit transmits at least one selected from the group consisting of a purchase amount of electric power, a purchase price of electric power, a selling amount of electric power and a selling price of electric power to at least one of said electric power supplier and the other nodes.

6. The electric power supply and demand management system in accordance with claim 1, wherein
   said first calculation unit or said second calculation unit predicts an amount of electric power consumption of said node or said group and determines an amount of electric power supply, which is demanded by said node or said group, by using said predicted amount of electric power consumption as a parameter, and said first transmission unit or said second transmission unit transmits a signal in order for an electric power generator of a node or a group other than said node or said group, or for said electric power supplier to supply said amount of electric power.

7. The electric power supply and demand management system in accordance with claim 1, comprising
an electric power consumption amount storage means configured to store information regarding an amount of electric power consumption of each node, and
said first calculation unit or said second calculation unit predicts an amount of electric power consumption of each node or each group by using said stored amount of electric power consumption as a parameter.

8. The electric power supply and demand management system in accordance with claim 6, wherein
said first calculation unit or said second calculation unit determines an amount of electric power supply from said node by using data including a relation between an output of said electric power generator and an amount of fuel consumption as parameters.

9. The electric power supply and demand management system in accordance with claim 6, wherein
said first calculation unit or said second calculation unit determines an amount of electric power supply from said electric power generator by using at least said amount of electric power consumption of said node as a parameter.

10. The electric power supply and demand management system in accordance with claim 9, wherein
said first calculation unit or said second calculation unit determines an amount of electric power supply of each electric power generator so that the number of electric power generators in operation of said nodes becomes minimum or maximum.

11. The electric power supply and demand management system in accordance with claim 9, wherein
said first calculation unit or said second calculation unit predicts an amount of electric power consumption of each node by using a schedule information.

12. The electric power supply and demand management system in accordance with claim 9, wherein
said first transmission unit or said second transmission unit transmits information for increasing/decreasing an amount of electric power supply from a storage battery of said each node or said electric power generator connected to said storage battery to a node, which requires electric power, by using information regarding a storage amount of said storage battery or information regarding a transfer amount of energy of each node.

13. The electric power supply and demand management system in accordance with claim 1, wherein said electric power supplier has a reception unit for receiving information selected from the group consisting of an electric power charge, an amount of electric power consumption and an electric power supply capacity of said node or said group,
said first calculation unit determines an amount of electric power and a purchase price of electric power demanded by said electric power supplier for each node, which can sell electric power among said nodes, on the basis of said information, and
said first transmission unit transmits at least one of said amount of electric power and said purchase price demanded by said electric power supplier to said node.

14. The electric power supply and demand management system in accordance with claim 1, wherein said node or said group is provided with;
a second transmission unit configured to transmit information selected from the group consisting of an electric power charge, an amount of electric power consumption and an electric power supply capacity to other nodes, groups or said electric power supplier;
a second reception unit configured to receive information selected from the group consisting of an amount of electric power, a purchase price of electric power and a selling price of electric power demanded by said other nodes, groups or said electric power supplier; and
a control unit configured to control an output of said electric power generator of said node on the basis of said information.

* * * * *